(12) United States Patent
DeWitt et al.

(10) Patent No.: US 10,948,363 B2
(45) Date of Patent: Mar. 16, 2021

(54) OVERHEAT TESTING APPARATUS FOR OPTICAL FIBER

(71) Applicant: Kidde Technologies, Inc., Wilson, NC (US)

(72) Inventors: Darryl J. DeWitt, Raleigh, NC (US); Lei Liu, Wake Forest, NC (US)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 0 days.

(21) Appl. No.: 16/417,066

(22) Filed: May 20, 2019

(65) Prior Publication Data

US 2020/0370967 A1 Nov. 26, 2020

(51) Int. Cl.
*G01K 11/32* (2006.01)
*G01K 11/3206* (2021.01)
(Continued)

(52) U.S. Cl.
CPC .......... *G01K 11/3206* (2013.01); *B64D 45/00* (2013.01); *G01K 3/005* (2013.01);
(Continued)

(58) Field of Classification Search
CPC .... G01K 11/3206; G01K 3/005; B64D 45/00; B64D 2045/0085; B64D 2045/009;
(Continued)

(56) References Cited

U.S. PATENT DOCUMENTS 5,963,680 A * 10/1999 Kleinerman ......... G01D 5/3538
250/458.1
6,204,920 B1 3/2001 Ellerbrock et al.
(Continued)

FOREIGN PATENT DOCUMENTS

DE 19933268 A1 * 1/2001 ........... H04B 10/071
EP 1524509 A1 4/2005
(Continued)

OTHER PUBLICATIONS

European Search Report Issued in European Application No. 19210188.9 dated Jun. 23, 2020; 13 Pages.
(Continued)

*Primary Examiner* — Jerry M Blevins
(74) *Attorney, Agent, or Firm* — Cantor Colburn LLP (57) ABSTRACT

Disclosed is an optical fiber overheat detection testing apparatus including an optical fiber having a first end and a second end, the optical fiber having a predetermined length associated with a predetermined attenuation based on an overheat detection instrument loop. The apparatus includes a first interrupt disposed equidistant between the first end and the second end defining a first half of the optical fiber and a second half of the optical fiber, the first half and the second half having equal length, the first interrupt having a first actuator operable by a first electric current to attenuate light wave traversal of the optical fiber. The apparatus includes a second interrupt disposed on the first half and spaced from the first end at least six tenths of a meter, the second interrupt having a second actuator operable by a second electric current to attenuate light wave traversal of the optical fiber.

18 Claims, 4 Drawing Sheets

(51) Int. Cl.
*G01M 11/00* (2006.01)
*B64D 45/00* (2006.01)
*G02B 6/42* (2006.01)
*G08B 17/06* (2006.01)
*G01K 3/00* (2006.01)
*H04B 10/071* (2013.01)

(52) U.S. Cl.
CPC ........... *G01M 11/33* (2013.01); *G02B 6/4266* (2013.01); *G08B 17/06* (2013.01); *H04B 10/071* (2013.01); *B64D 2045/009* (2013.01); *B64D 2045/0085* (2013.01)

(58) Field of Classification Search
CPC ..... G01M 11/33; G02B 6/4266; G08B 17/06; H04B 10/071
USPC .......................................................... 385/12
See application file for complete search history.

(56) References Cited

U.S. PATENT DOCUMENTS

| | | |
|---|---|---|
| 6,411,746 B1 | 6/2002 | Chamberlain et al. |
| 6,489,606 B1 | 12/2002 | Kersey et al. |
| 6,876,786 B2 | 4/2005 | Chilaguine et al. |
| 7,157,692 B2 | 1/2007 | Taylor et al. |
| 7,418,171 B2 | 8/2008 | Grattan et al. |
| 7,538,860 B2 | 5/2009 | Moore |
| 7,787,726 B2 | 8/2010 | Ten Eyck et al. |
| 8,172,180 B2 | 5/2012 | Press |
| 8,488,114 B2 | 7/2013 | Gaspari |
| 10,112,726 B2 | 10/2018 | Wilson et al. |
| 10,260,964 B2 | 4/2019 | Fisk et al. |
| 10,408,694 B2 | 9/2019 | Jaaskelainen et al. |
| 10,436,652 B2 | 10/2019 | Wilson et al. |
| 2002/0125414 A1 | 9/2002 | Dammann |
| 2004/0052299 A1 | 3/2004 | Jay et al. |
| 2008/0285916 A1 | 11/2008 | Sappey et al. |
| 2009/0040046 A1* | 2/2009 | Browning, Jr. et al. ..................... G08B 13/186 340/552 |
| 2010/0066548 A1* | 3/2010 | Cox et al. ............ G01F 23/2921 340/619 |
| 2013/0322490 A1 | 12/2013 | Bell et al. |
| 2014/0266742 A1 | 9/2014 | Rennie |
| 2015/0212273 A1 | 7/2015 | Sandstrom et al. |
| 2015/0323418 A1* | 11/2015 | Cheng et al. ........ G01D 5/35387 356/73.1 |
| 2017/0334575 A1 | 11/2017 | Wilson et al. |
| 2017/0336268 A1 | 11/2017 | Wilson et al. |
| 2017/0371117 A1 | 12/2017 | Jebali |
| 2018/0340841 A1 | 11/2018 | Coreth et al. |
| 2019/0025095 A1 | 1/2019 | Steel et al. |
| 2019/0277669 A1 | 9/2019 | Miller |
| 2019/0277708 A1 | 9/2019 | Miller |
| 2019/0277709 A1 | 9/2019 | Miller et al. |
| 2019/0383672 A1 | 12/2019 | Liu et al. |

FOREIGN PATENT DOCUMENTS

| | | | |
|---|---|---|---|
| EP | 3246683 A1 | 11/2017 | |
| JP | 07324994 A | * 12/1995 | ............. G01K 11/12 |

OTHER PUBLICATIONS

European Search Report Issued in European Application No. 19212777.7 dated Jun. 23, 2020; 12 Pages.

* cited by examiner

OVERHEAT TESTING APPARATUS FOR OPTICAL FIBER

BACKGROUND

Exemplary embodiments pertain to the art of overheat testing equipment for optical fiber aircraft temperature detection systems. Temperature detection may be provided to aircraft operators and controllers. Such systems may require testing and assessment to determine proper operation.

BRIEF DESCRIPTION

Disclosed is an optical fiber overheat detection testing apparatus including an optical fiber having a first end and a second end, the optical fiber having a predetermined length associated with a predetermined attenuation based on an overheat detection instrument loop. The apparatus includes a first interrupt disposed equidistant between the first end and the second end defining a first half of the optical fiber and a second half of the optical fiber, the first half and the second half having equal length, the first interrupt having a first actuator operable by a first electric current to attenuate light wave traversal of the optical fiber. The apparatus includes a second interrupt disposed on the first half and spaced from the first end at least six tenths of a meter, the second interrupt having a second actuator operable by a second electric current to attenuate light wave traversal of the optical fiber.

In addition to one or more of the features described above, or as an alternative, further embodiments may include a third interrupt disposed on the second half and spaced from the second end at least six tenths of a meter, the third interrupt having a third actuator operable by a third electric current to attenuate light wave traversal of the optical fiber.

In addition to one or more of the features described above, or as an alternative, further embodiments may include that the first interrupt is a fiber optic switch having a pole therein, and the first actuator adjusts an attitude of the pole within the fiber optic switch based on the first electric current.

In addition to one or more of the features described above, or as an alternative, further embodiments may include that the second interrupt is a fiber optic switch having opposing poles having respective reflectors.

In addition to one or more of the features described above, or as an alternative, further embodiments may include a test controller having stored test instructions operable upon execution to, responsive to a start command, increase attenuation associated with the first interrupt and responsive to the increase, and receive a degraded circuit indication.

In addition to one or more of the features described above, or as an alternative, further embodiments may include a test controller having stored test instructions operable upon execution to, responsive to a start command, open the first interrupt and responsive to the first interrupt being opened, receive an open circuit indication.

In addition to one or more of the features described above, or as an alternative, further embodiments may include that the stored test instructions operable upon execution to open the second interrupt and responsive to the second interrupt being opened, receive the open circuit indication.

In addition to one or more of the features described above, or as an alternative, further embodiments may include that the stored test instructions operable upon execution to close the first interrupt within a predetermined intermittent threshold and responsive to the first interrupt being closed within the predetermined intermittent threshold, receive an intermittent connection indication.

In addition to one or more of the features described above, or as an alternative, further embodiments may include an operations controller having stored operations instructions operable upon execution to send an output signal through the optical fiber and, responsive to an input signal having an attenuation greater than an attenuation threshold with respect to the output signal, send the open circuit indication.

In addition to one or more of the features described above, or as an alternative, further embodiments may include that the attenuation is a complete loss of signal.

In addition to one or more of the features described above, or as an alternative, further embodiments may include that the stored test instructions and the stored operations instructions are operable upon execution by a processor.

Also disclosed is a method including operating a first interrupt such that a light wave is blocked from traversing an optical fiber. The operation is responsive to a start command. The method includes receiving an open circuit indication. The method includes operating a second interrupt such that the light wave is blocked from traversing the optical fiber. The operation is responsive to receiving the open circuit indication.

In addition to one or more of the features described above, or as an alternative, further embodiments may include operating the first interrupt within a predetermined intermittent threshold and responsive to the first interrupt being operated within the predetermined intermittent threshold, receive the an intermittent connection indication.

In addition to one or more of the features described above, or as an alternative, further embodiments may include receiving the open circuit indication. The receiving is responsive to the second interrupt being opened.

In addition to one or more of the features described above, or as an alternative, further embodiments may include sending an output signal through the optical fiber including the light wave.

In addition to one or more of the features described above, or as an alternative, further embodiments may include sending the open circuit indication. The sending is responsive to an input signal having an attenuation greater than an attenuation threshold with respect to the output signal.

In addition to one or more of the features described above, or as an alternative, further embodiments may include that the attenuation is a complete loss of signal.

In addition to one or more of the features described above, or as an alternative, further embodiments may include that the operation of the first interrupt is by increasing output of a current source associated with a first actuator of the first interrupt.

In addition to one or more of the features described above, or as an alternative, further embodiments may include that the operation of the second interrupt is by increasing output of a current source associated with a second actuator of the second interrupt.

Also disclosed is an optical fiber overheat detection testing apparatus. The apparatus includes an optical fiber having a first end and a second end, the optical fiber having a predetermined length associated with a predetermined attenuation based on an overheat detection instrument loop. The apparatus includes a first interrupt disposed equidistant between the first end and the second end defining a first half of the optical fiber and a second half of the optical fiber, the first half and the second half having equal length, the first interrupt having a first actuator operable by a first electric current to attenuate light wave traversal of the optical fiber.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Optical fibers may be distributed throughout aircraft for temperature detection. For example, aircraft wings and sections associated with bleed air may be configured with optical fibers to detect overheat and provide temperature indications. Control signals may be sent from controllers through sensing instruments to detect temperature deviations. For example, fiber Bragg gratings may be disposed along an optical fiber instrument loop. The optical fiber instrument loop may terminate at a controller. The controller may have transmit and receive ports for sending and receiving a light spectrum.

The controller may be operable to detect a change in temperature through changes in received light spectrum after traversing the optical fiber. For the example, the changes may include attenuation of particular wavelengths or frequencies of the light spectrum. Further, a predetermined shift of the particular permitted wavelengths may occur proportionate or otherwise associated with the change in temperature. As such, the change in temperature associated with particular portions of the optical fiber may be detected.

Optical fiber may experience operational transients. For example, the optical fiber may provide a faulty connection between the transmitting and receiving ends. That is, the optical fiber may become disconnected or otherwise alter the transmitted light spectrum. A controller may be operable to detect such situations. An optical fiber testing apparatus may be arranged to simulate optical fiber operation, so that optical fiber controllers may be tested. Testing may occur offline or during operation.

For example, a test controller may be configured to operate an optical fiber testing apparatus and receive expected responses from the optical fiber operations controller. That is, the operations controller aboard the aircraft to detect overheat situations and temperature transients may be tested by the test controller and the optical fiber testing apparatus to ensure proper operation.

Figure 1:
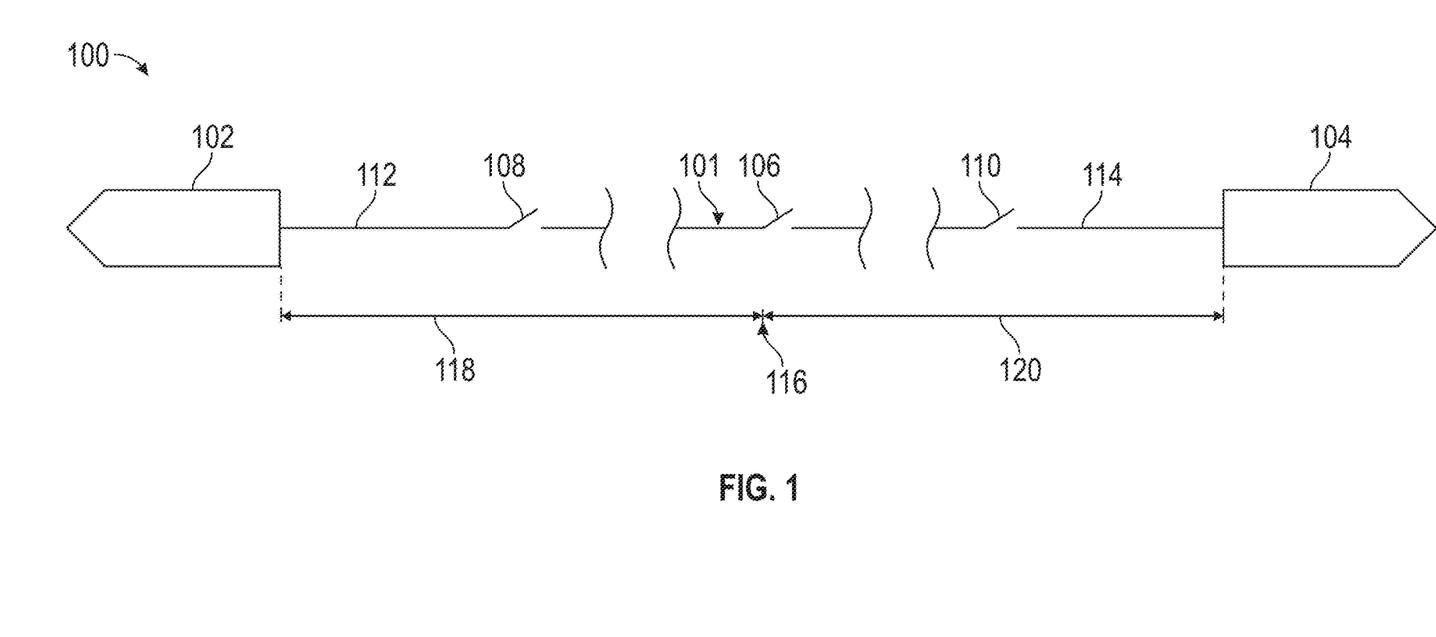
FIG. 1 is a plan view of an optical fiber testing apparatus.

Referring to FIG. 1 an optical fiber overheat detection testing apparatus 100 is shown. The optical fiber overheat detection testing apparatus 100 includes an optical fiber 101. The optical fiber 101 may be of any form and made of any fiber optic material. The optical fiber 101 has a first end 102 and a second end 104. As one example, the first end 102 may be a transmitting end and the second end 104 may be a receiving end. The ends 102, 104 may be joined with transmit and receive ports of a controller.

The optical fiber, as measured from the first end 102 to the second end 104 may have a length 116. The length may be sized to provide a predetermined attenuation. That is, the attenuation of light from end 102 to end 104 is predetermined. The attenuation may be based on an overheat detection instrument loop. The overheat detection instrument loop may be installed on an aircraft. For example, the overheat detection instrument loop may be installed on an aircraft wing. The overheat detection instrument loop may include overheat detection sensing instruments and other components but further have a baseline attenuation to a light spectrum or set of wavelengths that garner appreciable or detectable attenuation from the first end 102 to the second end 104. As such, the optical fiber 101 may have a predetermined length 116 sized to match or approximately match the appreciable attenuation of the overheat detection instrument loop the test is associated with. Different lengths may be used to mimic aircraft overheat detection instrument loops associated with a fleet of aircrafts.

A first interrupt 106 may be disposed on the optical fiber 101. The first interrupt 106 may be a fiber optic switch. The fiber optic switch may be operated by any actuator including hydraulic, pneumatic, or electromechanical. The first interrupt 106 may be disposed equidistant from the first end 102 and the second end 104, dividing the optical fiber 101 into a first half 112 and a second half 114, respectively. The first half 112 and the second half 114 may have equal length. For example, the optical fiber 101 may have overall length 116 and the first half 112 may have length 118. The second half 114 may have length 120.

A second interrupt 108 may be disposed on the first half 112. The second interrupt 108 may be a fiber optic switch. The second interrupt 108 may be spaced from the first end 102 by at least six tenths of a meter. A third interrupt 110 may be disposed on the second half 114. The third interrupt 110 may be a fiber optic switch. The third interrupt 110 may be spaced from the second end by at least six tenths of a meter.

Figure 2A:
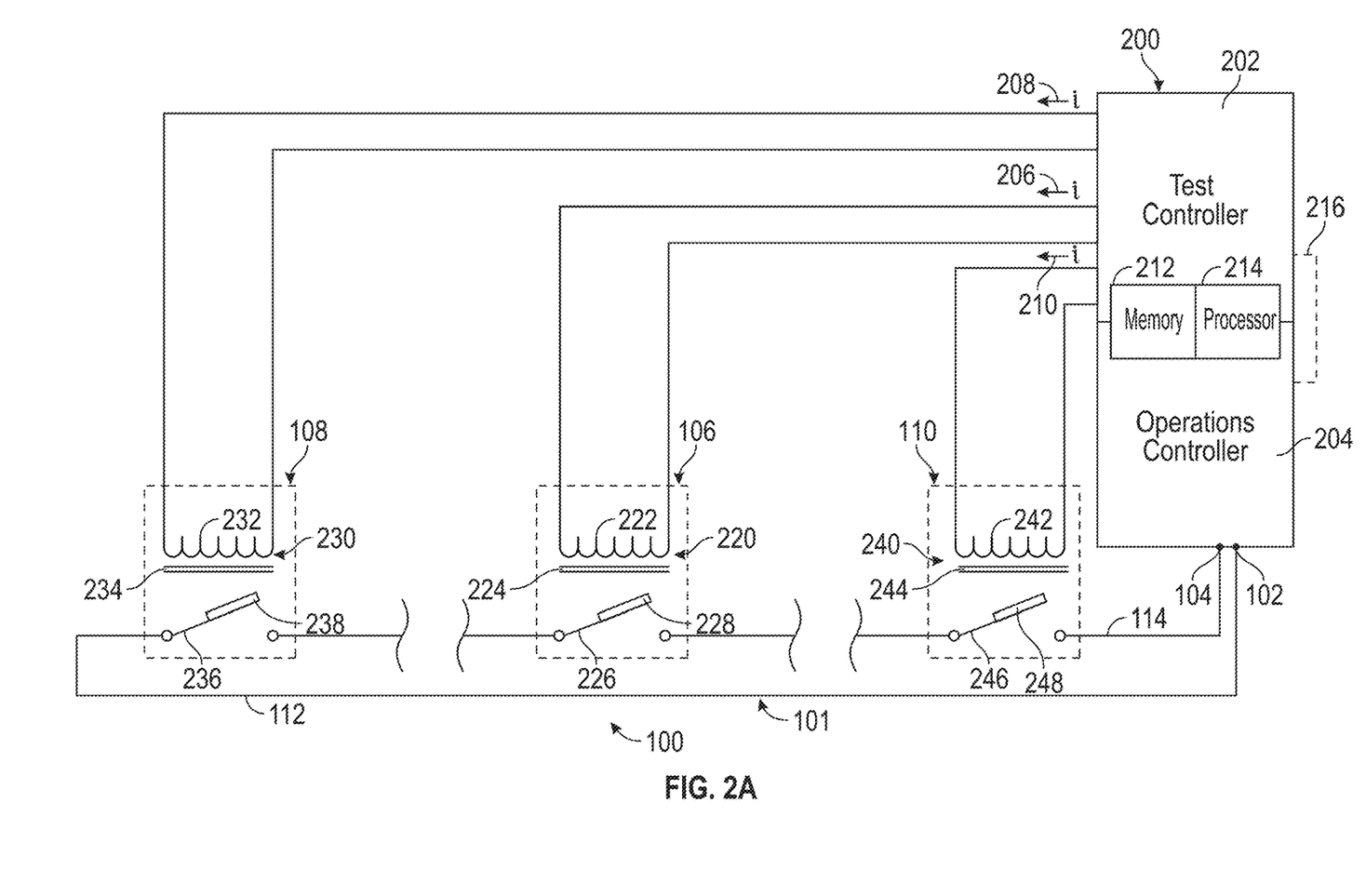
FIG. 2A is a schematic of a controller associated with the optical fiber testing apparatus.
Figure 2B:
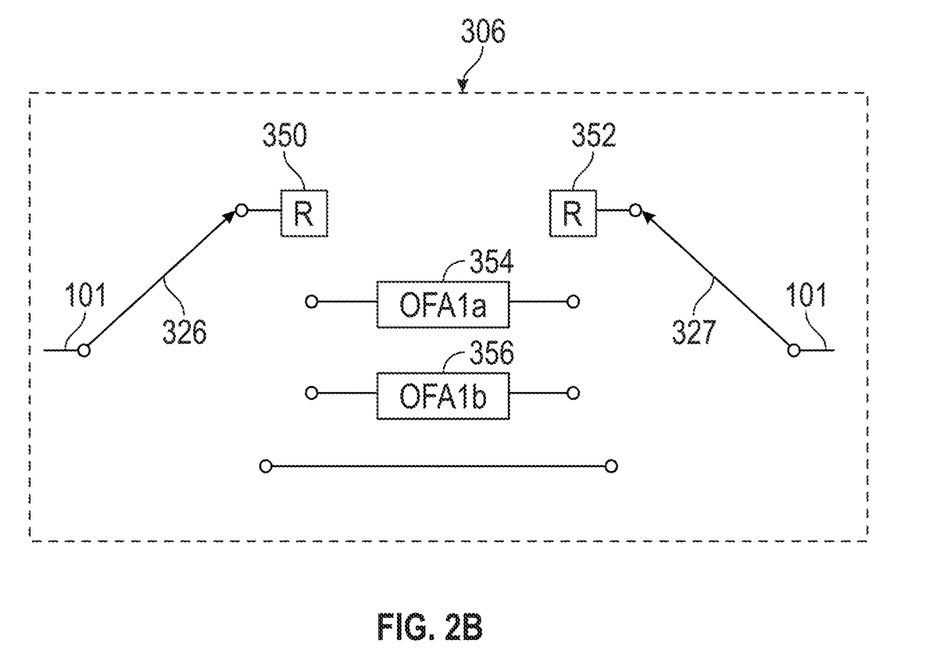
FIG. 2B is a schematic of one example of an interrupt.

Referring to FIGS. 2A-B, the optical fiber overheat detection testing apparatus 100 is coupled with or includes controller 200. The controller 200 may include any combination of processors, field programmable gate arrays (FPGA), or application specific integrated circuits (ASIC). The controller may include memory, volatile and non-volatile, operable to store machine instructions from the processors and other processing mechanisms to receive, calculate, and control devices, as necessary. Machine instructions may be stored in any language or representation, including but not limited to machine code, assembly instructions, C, C++, C #, PASCAL, COBAL, PYTHON, JAVA, and RUBY. It should be appreciated that any type of wired or wireless configuration is appreciated for any of the communications from the controller. Wireless protocols such as ZIGBEE, WI-FI, BLUETOOTH, or any other implement may be used. Communications may be realized through any protocol or medium known or unknown.

The controller 200 may include the test controller 202 and the operations controller 204. The controller test controller 202 may be disposed on or with the same hardware as the operations controller 204. The test controller 202 may be disposed independent of the operations controller 204. The test controller 202 may share a processor 214 and memory 212 with the operations controller 204. The test controller 202 may have an independent processor and associated memory. As one example, the operations controller 204 and the test controller 216 may include data channels 216 disposed to facilitate information exchange among the two and other controls apparatuses.

Operations controller 204 may include an interface to send light or output signal from the first end 102 through the optical fiber 101 for reception as an input signal at the second end 104. The test controller 202 may include interfaces associated with each one of the interrupts 106, 108, 110. The first interrupt 106 may include a first actuator 222 or electromagnet having a coil and an iron core 224. The first actuator 222 may receive a first electric current 206 from a current source of the test controller 202 to operate the interrupt 106. For example, the interrupt 106 may be switch having a single pole 226. The pole 226 may include a magnet 228 that is operated by the first actuator 222. An attitude of the pole 226 or angle of the pole with respect to the optical fiber 101 may be adjusted to change attenuation of the signal. To increase the attenuation associated with first interrupt 106, current 206 may flow through the first actuator 222 to offset the pole 226 from the optical fiber 101. That is, the first actuator 222 may open the interrupt 106 to varying degrees. The first interrupt 106 may be a switch. The switch may be a single pole 226 single throw type switch or other type of switch or apparatus configured increase attenuation of the light signal from operations controller 204.

The second interrupt 108 may include a second actuator 232 or electromagnet having a coil and an iron core 234. The second actuator 232 may receive a second electric current 208 from a current source of the test controller 202 to operate the interrupt 108. For example, the interrupt 108 may be switch having a single pole 236. The pole 236 may include a magnet 238 that is operated by the second actuator 232. An attitude of the pole 236 or angle of the pole with respect to the optical fiber 101 may be adjusted to change attenuation of the signal. To increase the attenuation associated with second interrupt 108, current 208 may flow through the second actuator 232 to offset the pole 236 from the optical fiber 101. That is, the second actuator 232 may open the interrupt 108 to varying degrees. The second interrupt 108 may be a switch. The switch may be a single pole 236 single throw type switch or other type of switch or apparatus configured increase attenuation of the light signal from operations controller 204.

The third interrupt 110 may include a third actuator 242 or electromagnet having a coil and an iron core 244. The third actuator 242 may receive a third electric current 210 from a current source of the test controller 202 to operate the interrupt 110. For example, the interrupt 110 may be switch having a single pole 246. The pole 246 may include a magnet 248 that is operated by the third actuator 242. An attitude of the pole 246 or angle of the pole with respect to the optical fiber 101 may be adjusted to change attenuation of the signal. To increase the attenuation associated with third interrupt 110, current 210 may flow through the third actuator 242 to offset the pole 246 from the optical fiber 101. That is, the third actuator 242 may open the interrupt 110 to varying degrees. The third interrupt 110 may be a switch. The switch may be a single pole 246 single throw type switch or other type of switch or apparatus configured increase attenuation of the light signal from operations controller 204.

As an example, FIG. 2B includes an interrupt 306. The first interrupt 106, second interrupt 108 and the third interrupt 110 may include similar components or configurations. As shown, the interrupt 306 includes opposing poles 326, 327 in a quad throw configuration. The first position of includes both of the opposing poles 326, 327 of the interrupt 306 terminating in respective reflectors 350, 352. The respective reflectors 350, 352 may reflect light received from optical fiber 101 back to respective ends 102, 104. Further, the opposing poles 326, 327 may be oriented in a second position to direct light of the optical fiber 101 through a first attenuator 354 having a first predetermined attenuation value. The opposing poles 326, 327 may be oriented in a third position to direct light of the optical fiber 101 through a second attenuator 356 having a second predetermined attenuation value. It should be appreciated that the interrupt 306 may include any number of attenuators. The opposing poles 326, 327 may be oriented in a fourth position to remove attenuation or reflection of light traveling on the optical fiber 101. The opposing poles 326, 327 may be oriented as disclosed with regard to other poles in this disclosure.

Figure 3:
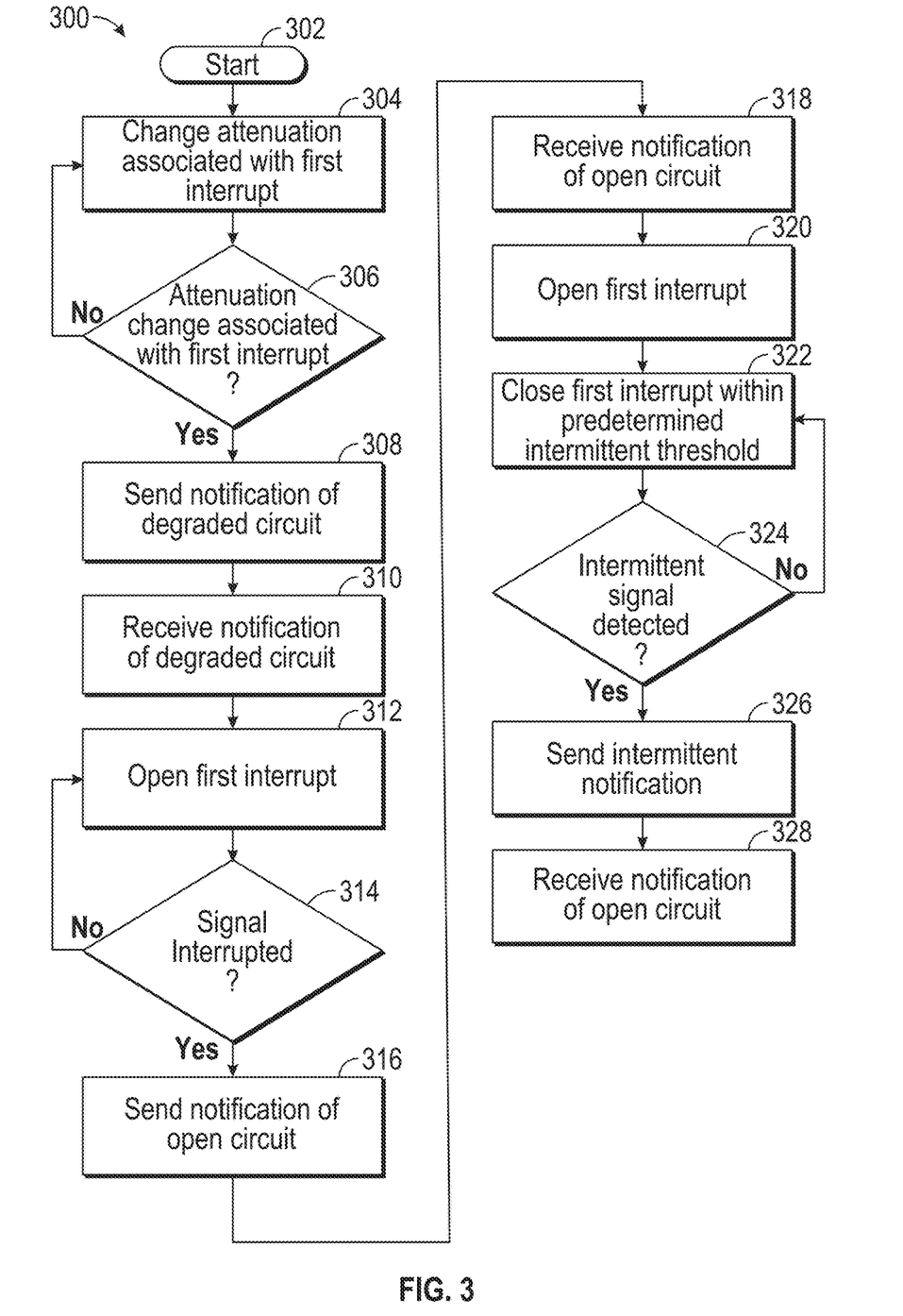
FIG. 3 is a method for operating an optical fiber testing apparatus.

Referring to FIG. 3, a method 300 is shown. The method 300 begins in block 302. For example, block 302 may include a start command received from one of the controllers 202, 204 or another controller, signaling initialization of the test. In block 304 an attenuation associated with the first interrupt 106 is changed. It should be appreciated that any or all of these blocks or steps may be applied to the other interrupts 108, 110 or other components in any order or sequence. The blocks may be repeated, omitted, parallelized, or rearranged. In block 306, an attenuation change 306 is detected by the controller 200.

The controller may determine the received signal attenuation and compare the attenuation against an attenuation threshold. For example, the attenuation threshold may be −10 dB. If the received signal has an attenuation of less than −10 dB, the operations controller 204 may output an indication as such. The change in attenuation may be a complete loss of signal, reduced power of signal, change in wavelength, or another change to the light sent by the controller 200 from first end 102 or another outlet. In block 308, a notification of a degraded circuit, a degraded circuit indication, may be sent from the operations controller 204 or another controller to the test controller 202. In block 310, the test controller 202 receives the indication. The indication may be an open circuit indication. Such communications link may simulate an operational aircraft where an increase in attenuation is detected onboard the aircraft by the operations controller 204 and sent to the cockpit or other controllers of the aircraft to address the change in attenuation.

In block 312, the controller 200 may open a first interrupt 106. The controller 200 may detect an interrupted light signal in step block 314. In block 316, the notification of the open circuit is sent from the operations controller 204 to the test controller 202. In block 318, the test controller 202 receives the notification. In block 320, the first interrupt 106 may be opened. In step 322, the first interrupt may be closed within a predetermined intermittent threshold. For example, the predetermined intermittent threshold may be based on a signal processing or scanning period for the operations controller 204. The predetermined intermittent threshold may be substantially close to the signal processing period to ensure proper signal measurement by the operations controller 204. In block 324 the intermittent signal is detected. In block 326, the intermittent connection indication is sent from the operations controller 204 to the test controller 202 via communications path 216. In block 328, the intermittent notification is received by the test controller 202. The test controller 202 may output test results to a display or server.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An optical fiber overheat detection testing apparatus comprising:
   an optical fiber having a first end and a second end, the optical fiber having a predetermined length associated with a predetermined attenuation based on an overheat detection instrument loop;
   a first interrupt disposed equidistant between the first end and the second end defining a first half of the optical fiber and a second half of the optical fiber, the first half and the second half having equal length, the first interrupt having a first actuator operable by a first electric current to attenuate light wave traversal of the optical fiber;
   a second interrupt disposed on the first half and spaced from the first end at least six tenths of a meter, the second interrupt having a second actuator operable by a second electric current to attenuate light wave traversal of the optical fiber, and
   a test controller having stored test instructions operable upon execution to, responsive to a start command, increase attenuation associated with the first interrupt and responsive to the increase, receive a degraded circuit indication.

2. The optical fiber overheat detection testing apparatus of claim 1 further comprising, a third interrupt disposed on the second half and spaced from the second end at least six tenths of a meter, the third interrupt having a third actuator operable by a third electric current to attenuate light wave traversal of the optical fiber.

3. The optical fiber overheat detection testing apparatus of claim 1, wherein the first interrupt is a fiber optic switch having a pole therein, and the first actuator adjusts an attitude of the pole within the fiber optic switch based on the first electric current.

4. The optical fiber overheat detection testing apparatus of claim 1, wherein the second interrupt is a fiber optic switch having opposing poles having respective reflectors.

5. The optical fiber overheat detection testing apparatus of claim 1 further comprising, a test controller having stored test instructions operable upon execution to, responsive to a start command, open the first interrupt and responsive to the first interrupt being opened, receive an open circuit indication.

6. The optical fiber overheat detection testing apparatus of claim 5, wherein the stored test instructions operable upon execution to open the second interrupt and responsive to the second interrupt being opened, receive the open circuit indication.

7. The optical fiber overheat detection testing apparatus of claim 5, wherein the stored test instructions operable upon execution to close the first interrupt within a predetermined intermittent threshold and responsive to the first interrupt being closed within the predetermined intermittent threshold, receive an intermittent connection indication.

8. The optical fiber overheat detection testing apparatus of claim 5 further comprising an operations controller having stored operations instructions operable upon execution to send an output signal through the optical fiber and, responsive to an input signal having an attenuation greater than an attenuation threshold with respect to the output signal, send the open circuit indication.

9. The optical fiber overheat detection testing apparatus of claim 8, wherein the attenuation is a complete loss of signal.

10. The optical fiber overheat detection testing apparatus of claim 8, wherein the stored test instructions and the stored operations instructions are operable upon execution by a processor.

11. A method comprising:
    responsive to a start command, operating a first interrupt such that a light wave is blocked from traversing an optical fiber;
    receiving an open circuit indication;
    responsive to receiving the open circuit indication, operating a second interrupt such that the light wave is blocked from traversing the optical fiber; and
    operating the first interrupt within a predetermined intermittent threshold and responsive to the first interrupt being operated within the predetermined intermittent threshold, receiving an intermittent connection indication.

12. The method of claim 11 further comprising, responsive to the second interrupt being opened, receiving the open circuit indication.

13. The method of claim 11 further comprising, sending an output signal through the optical fiber including the light wave.

14. The method of claim 13 further comprising, responsive to an input signal having an attenuation greater than an attenuation threshold with respect to the output signal, sending the open circuit indication.

15. The method of claim 14, wherein the attenuation is a complete loss of signal.

16. The method of claim 11, wherein the operation of the first interrupt is by increasing output of a current source associated with a first actuator of the first interrupt.

17. The method of claim 11, wherein the operation of the second interrupt is by increasing output of a current source associated with a second actuator of the second interrupt.

18. An optical fiber overheat detection testing apparatus comprising:
    an optical fiber having a first end and a second end, the optical fiber having a predetermined length associated with a predetermined attenuation based on an overheat detection instrument loop;
    a first interrupt disposed equidistant between the first end and the second end defining a first half of the optical fiber and a second half of the optical fiber, the first half and the second half having equal length, the first interrupt having a first actuator operable by a first electric current to attenuate light wave traversal of the optical fiber, and a test controller having stored test instructions operable upon execution to, responsive to a start command, increase attenuation associated with the first interrupt and responsive to the increase, receive a degraded circuit indication.

\* \* \* \* \*